US012221276B2

(12) United States Patent
Wilson et al.

(10) Patent No.: US 12,221,276 B2
(45) Date of Patent: Feb. 11, 2025

(54) DRAINAGE SYSTEM FOR DRAINING VISCOUS LIQUIDS FROM CONTAINERS

(71) Applicant: Chevron U.S.A. Inc., San Ramon, CA (US)

(72) Inventors: Mark Harmon Wilson, Lafayette, CA (US); Jesus Missael Cervantes Rodriguez, Suisun City, CA (US); Jeffery Hayes Webber, Vallejo, CA (US); Thomas Edward Chapman, Dixon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 20 days.

(21) Appl. No.: 18/191,855

(22) Filed: Mar. 28, 2023

(65) Prior Publication Data

US 2024/0327110 A1 Oct. 3, 2024

(51) Int. Cl.
*B65D 88/54* (2006.01)
*B67C 11/00* (2006.01)

(52) U.S. Cl.
CPC .............. *B65D 88/54* (2013.01); *B67C 11/00* (2013.01)

(58) Field of Classification Search
CPC .......... B65D 88/54; B67C 11/00; B67C 11/02
See application file for complete search history.

(56) References Cited

U.S. PATENT DOCUMENTS

| | | | | | | |
|---|---|---|---|---|---|---|
| 92,791 | A | * | 7/1869 | Burwell | F16N 33/00 | 141/339 |
| 205,665 | A | * | 7/1878 | Miller et al. | B65B 39/00 | 141/106 |
| 478,303 | A | * | 7/1892 | Allgood | F16N 33/00 | 141/332 |
| 2,230,180 | A | * | 1/1941 | Collins | F16N 37/00 | 141/342 |
| 2,781,065 | A | * | 2/1957 | Hofacer | F16N 37/00 | 211/133.1 |
| 4,399,847 | A | * | 8/1983 | McRoberts | B65B 3/06 | 248/311.3 |
| 4,515,188 | A | * | 5/1985 | Brutsman | B67C 11/02 | 141/86 |
| 4,665,958 | A | * | 5/1987 | Holloway | B67C 11/02 | 250/434 |
| 4,832,095 | A | * | 5/1989 | Bonnell | B67C 11/02 | 141/342 |
| 5,105,860 | A | * | 4/1992 | Connor | A47L 19/04 | D7/619.1 |
| 5,269,354 | A | * | 12/1993 | Koberg | F16N 33/00 | 141/332 |
| 5,291,921 | A | * | 3/1994 | Devine | B09B 3/00 | 220/571 |

(Continued)

*Primary Examiner* — Nicolas A Arnett
(74) *Attorney, Agent, or Firm* — King & Spalding LLP

(57) ABSTRACT

A drainage apparatus for draining viscous liquids from containers includes a collection tote and a rack. The rack includes at least one horizontal support bar with a plurality of tabs extending from the horizontal support bar. The plurality of tabs are configured at an acute angle relative to the horizontal support bar to optimize the draining of viscous fluids from a plurality of containers that are placed on the rack. The drainage apparatus is beneficial for draining fluids such as lubricants and coolants from containers so that the fluids can be repurposed and the containers can be recycled.

18 Claims, 8 Drawing Sheets

(56) References Cited

U.S. PATENT DOCUMENTS

| | | | | | |
|---|---|---|---|---|---|
| D360,214 | S * | 7/1995 | Loudon | D15/150 | |
| 5,477,897 | A * | 12/1995 | Scofield | B09B 3/00 | 141/105 |
| 5,522,437 | A * | 6/1996 | Blackburn | B09B 3/00 | 211/74 |
| 5,540,264 | A * | 7/1996 | Harp | B67D 1/0842 | 141/366 |
| 5,577,539 | A * | 11/1996 | Shaw | B67C 11/02 | D15/150 |
| 5,884,676 | A * | 3/1999 | Sage | F16N 31/002 | 141/86 |
| 6,276,410 | B1 * | 8/2001 | Esmeralda | B67C 11/02 | 141/105 |
| 6,405,765 | B1 * | 6/2002 | Handrick | F16N 31/002 | 141/331 |
| 6,408,898 | B1 * | 6/2002 | Huss | F16N 31/004 | 141/86 |
| 7,040,357 | B1 * | 5/2006 | Volkers | B09B 3/00 | 141/366 |
| 7,387,049 | B1 * | 6/2008 | Ver Hage | B67B 7/182 | 81/3.4 |
| 7,431,056 | B1 * | 10/2008 | Smith | F16N 33/00 | 206/349 |
| 10,822,139 | B2 * | 11/2020 | Wondra | B65D 5/72 | |
| 11,002,408 | B2 * | 5/2021 | Plourde | F16N 33/00 | |

* cited by examiner

DRAINAGE SYSTEM FOR DRAINING VISCOUS LIQUIDS FROM CONTAINERS

TECHNICAL FIELD

Embodiments of the technology relate to a rack system for draining viscous liquids from containers.

BACKGROUND

Plastic containers are typically used to contain viscous liquids such as lubricants and coolants. The plastic containers are useful in the production, sale, and use of these viscous liquids. The plastic containers are typically of a portable size, such as a gallon or quart, and are often manufactured from high-density polyethylene. Given the viscous nature of these liquids, it can be challenging to completely drain the liquids from the containers. This challenge is particularly acute in the production of the viscous liquids on a large scale involving thousands of containers because there are situations in which a batch of containers containing a viscous liquid must be drained. Such situations can arise, for instance, when packaging is damaged, when the product has expired, or when the product must be repurposed. Therefore, a need exists for improved apparatus and methods for draining viscous liquids from containers.

SUMMARY

The present disclosure is generally directed to a drainage system for draining viscous liquids from containers. In one example embodiment, an apparatus can comprise: (a) a collection tote into which viscous liquid is drained, the collection tote comprising a base, at least one wall, and a top opening; (b) a funnel placed on the top opening of the collection tote; and (c) a rack disposed on the funnel, the rack comprising a support bar extending horizontally across at least a portion of the funnel, the support bar comprising a plurality of tabs attached to and extending from the support bar.

The foregoing apparatus can include one or more of the following features. The apparatus can include a perforated plate disposed on the funnel wherein the rack is disposed on the perforated plate. Each of the plurality of tabs can comprise a tab longitudinal axis, the tab longitudinal axis of each of the plurality of tabs forming an acute angle with a support bar longitudinal axis of the support bar. The acute angle can be greater than 45 degrees and less than 90 degrees. Each of the plurality of tabs can comprise a length, a width, and a thickness, wherein the width is greater than or equal to 1 inch and less than or equal to 1.5 inches. The length of the tab can be parallel to the tab longitudinal axis and can be greater than or equal to 2 inches and less than or equal to 5 inches. Each of the plurality of tabs can be joined to the support bar by a base weld, and wherein each of the plurality of tabs has a tab protrusion located at a displacement distance from the base weld, the displacement distance being parallel to the tab longitudinal axis. When a container is placed onto one of the plurality of tabs, the tab protrusion displaces an opening of the container from the support bar by the displacement distance. The rack can further comprise a second support bar extending across at least a portion of the funnel and a second plurality of tabs attached to and extending from the second support bar, wherein the second support bar is spaced apart from the support bar by a distance that is greater than or equal to 5 inches and less than or equal to 18 inches. The rack can be fabricated with aluminum, stainless steel, other metal alloys, composites, and plastics.

In another example embodiment, a method for simultaneously draining a plurality of containers can comprise: (a) placing a funnel onto a collection tote; (b) placing a rack onto the funnel, the rack comprising a support bar extending horizontally across at least a portion of the funnel, the support bar comprising a plurality of tabs attached to and extending from the support bar; (c) using a cap removal tool to remove caps from the plurality of containers; (d) placing the plurality of containers in an inverted position onto the rack, wherein an opening of each container of the plurality of containers is placed onto a tab of the plurality of tabs; (c) draining viscous fluid from the plurality of containers into the collection tote; and (f) recycling the plurality of containers.

The foregoing method can comprise one or more of the following aspects. Each of the plurality of tabs can comprise a tab longitudinal axis, the tab longitudinal axis of each of the plurality of tabs forming an acute angle with a support bar longitudinal axis of the support bar. The acute angle can be greater than 45 degrees and less than 90 degrees. Each of the plurality of tabs can comprise a length, a width, and a thickness, wherein the width is greater than or equal to 1 inch and less than or equal to 1.5 inches. Each of the plurality of tabs can be joined to the support bar by a base weld, and wherein each of the plurality of tabs has a tab protrusion located at a displacement distance from the base weld, the displacement distance being parallel to the tab longitudinal axis. When a container of the plurality of containers is placed onto one of the plurality of tabs, the tab protrusion can displace an opening of the container from the support bar by the displacement distance. The displacement distance can be at least ⅛ of an inch and less than 2 inches. The container can remain on the tab until a drip rate of the viscous fluid draining from the container is less than three drips per minute. The cap removal tool can comprise: (a) a rotary motor that turns a drive shaft; and (b) a socket that attaches to the drive shaft, the socket being shaped to engage the caps of the plurality of containers, wherein the socket comprises knurling on an inner face of the socket. The socket can be detached from the drive shaft and a second socket can be attached to the drive shaft, the second socket having knurling of a second size that meshes with grooves on a second container cap.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of apparatus and methods for draining viscous liquids from containers. Therefore, the examples provided are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figure 1:
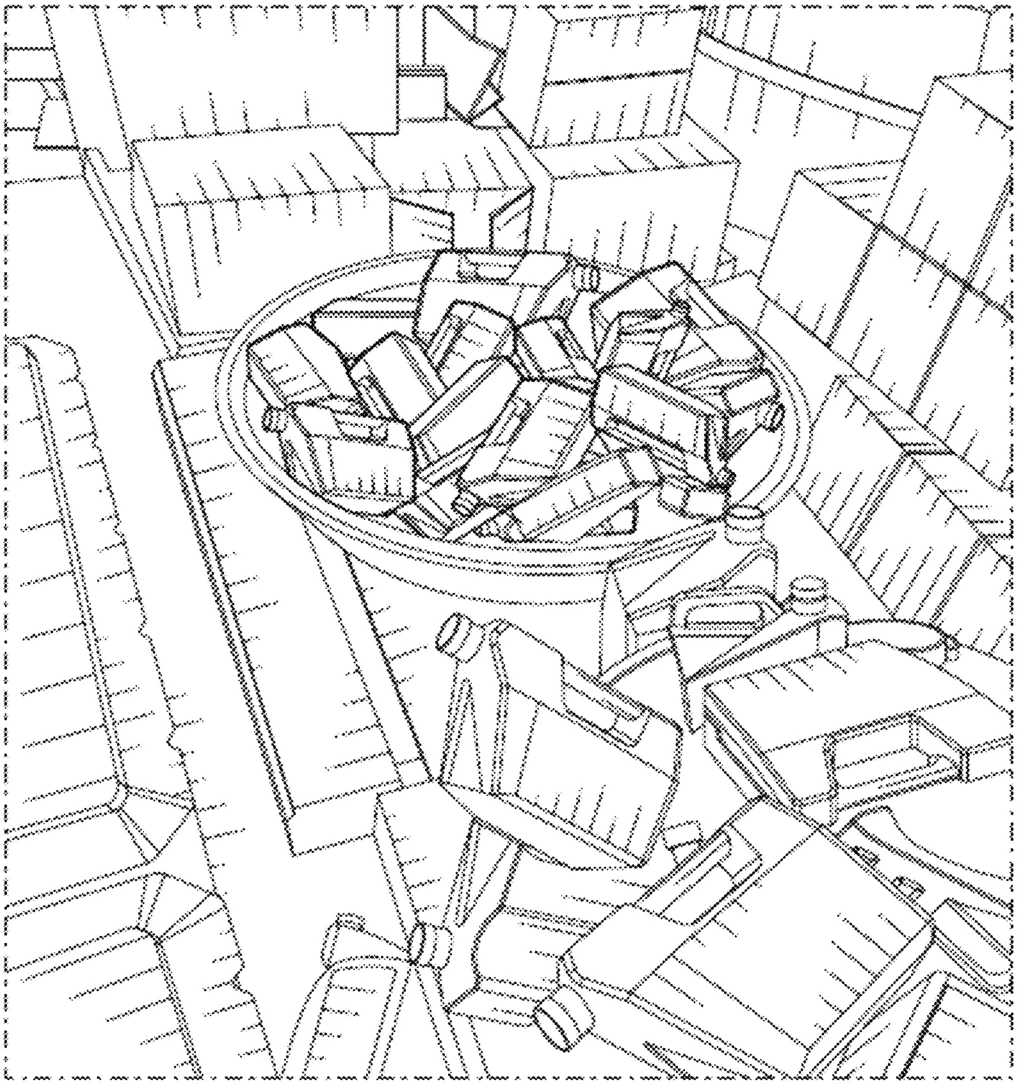
FIG. 1 illustrates containers containing motor oil lubricant that must be drained from the containers in accordance with an example embodiment of the disclosure.

The example embodiments discussed herein are directed to an improved method and system for draining viscous liquid, such as lubricants and coolants, from containers. As explained above, where viscous liquids, such as lubricants and coolants, are manufactured on a large scale, situations arise in which it is necessary to drain a large number of containers containing the viscous liquid. Such situations can include damaged labeling, expired product, or product that is to be repurposed. It can be challenging to drain the viscous liquids from many containers. When the need arises to drain many containers containing viscous liquids, it can often require hours to drain such liquids from each individual container when the liquids have a high viscosity. Sufficient draining of the viscous liquid from the containers is necessary to be able to efficiently recycle the containers. One industry standard for recycling plastic containers sets a minimum of less than three drips per minute from the container. In other words, the container must be sufficiently drained so that when in an inverted position, there are less than three drips per minute of any residual liquid falling from the opening of the container.

The ability to meet the three drips per minute standard is important, because it allows the plastic container to be recycled through normal recycling channels for plastic containers. In contrast, if the amount of residual liquid in the container exceeds the three drips per minute standard, the container may need to be handled as hazardous waste. Handling the container as hazardous waste eliminates the opportunity to recycle the container and involves higher handling costs.

In addition to the desire to recycle the plastic container, the viscous liquid drained from the containers also can often be recycled or repurposed for other products. Draining the viscous liquid from the containers for recycling or repurposing allows the manufacturer to recover some its costs. Accordingly, draining of substantially all of the viscous liquid from the containers improves efficiency and reduces waste of the viscous liquid.

Given the challenges with handling viscous liquids and the substantial time required to drain viscous liquids from containers, improved approaches to draining containers would be beneficial. In particular, the ability to drain viscous liquid from many containers simultaneously would improve the efficiency of the draining process. Furthermore, the ability to leave the containers in a draining position unattended by a worker so that workers can complete other tasks while the containers are draining would be beneficial. A system that drains viscous liquid from many containers while avoiding spilling of the viscous liquid would also be beneficial. Finally, a system that thoroughly drains viscous liquid from many containers allowing the containers to be recycled more easily is desirable.

The apparatus and methods of the following description address one or more of the foregoing problems with the handling of containers containing viscous liquids. While example embodiments are provided in the descriptions that follow, it should be understood that modifications to the embodiments described herein are within the scope of this disclosure. In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Referring now to FIG. 1, an illustration is provided showing numerous plastic containers containing a viscous lubricant that must be drained from the containers. As indicated in FIG. 1, when lubricants are manufactured on a large scale and a situation arises where a large number of containers must be drained, the work of draining the viscous liquid can be a substantial undertaking.

Figure 2:
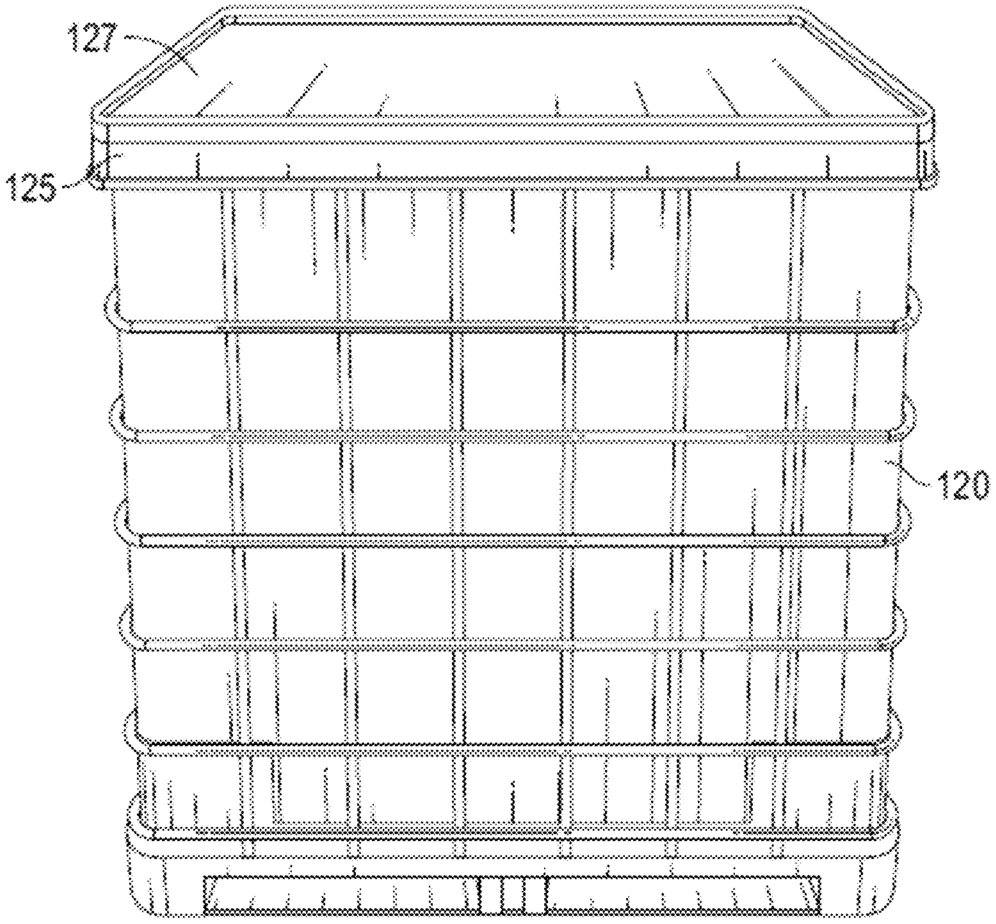
FIG. 2 illustrates a collection tote in accordance with an example embodiment of the disclosure.

FIG. 2 illustrates a portion of a drainage system for draining viscous fluid from a large number of containers. The portion of the drainage system shown in FIG. 2 includes a collection tote 120 into which the viscous fluid is drained. The example collection tote 120 of FIG. 2 includes four walls, a base, and an open top. In other example embodiments, the collection tote can have other shapes such as that of a barrel with a single rounded wall. The four walls and the base can be fabricated with a rigid plastic material and the four walls can be surrounded by a metallic cage that supports four walls. The metallic cage also includes a base with openings that allow the collection tote to be lifted and moved with a forklift. In the example of FIG. 2, a funnel 125 and a perforated top 127 are placed on the open top of the collection tote 120. The funnel 125 sits on the rim formed by the four walls of the collection tote 120 and the funnel directs the viscous liquid into the collection tote 120. The perforated top 127 provides support for a rack that will be placed on the drainage system. The perforated top 127 also prevents other objects from unintentionally falling into the collection tote 120.

Figure 3:
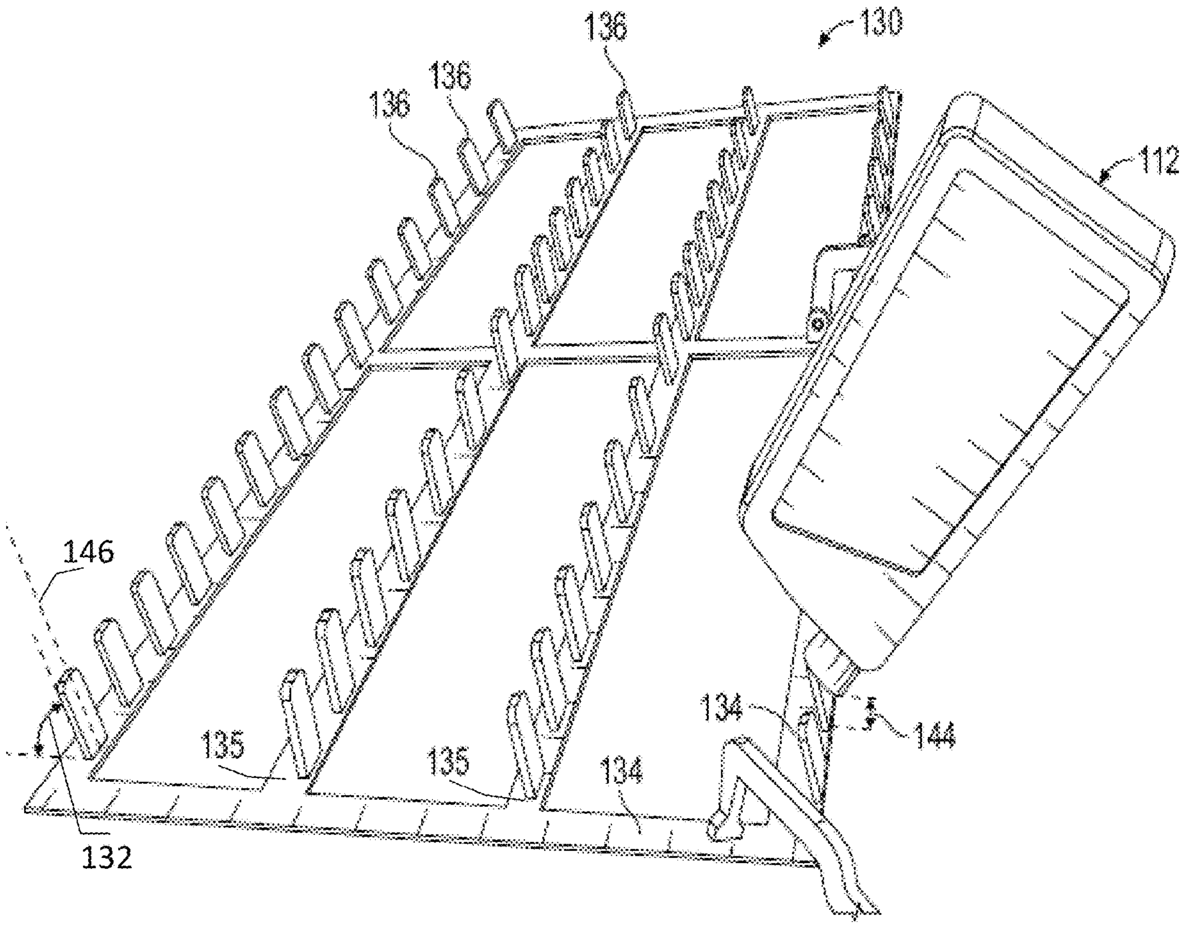
FIG. 3 illustrates a rack in accordance with an example embodiment of the disclosure.
Figure 4:
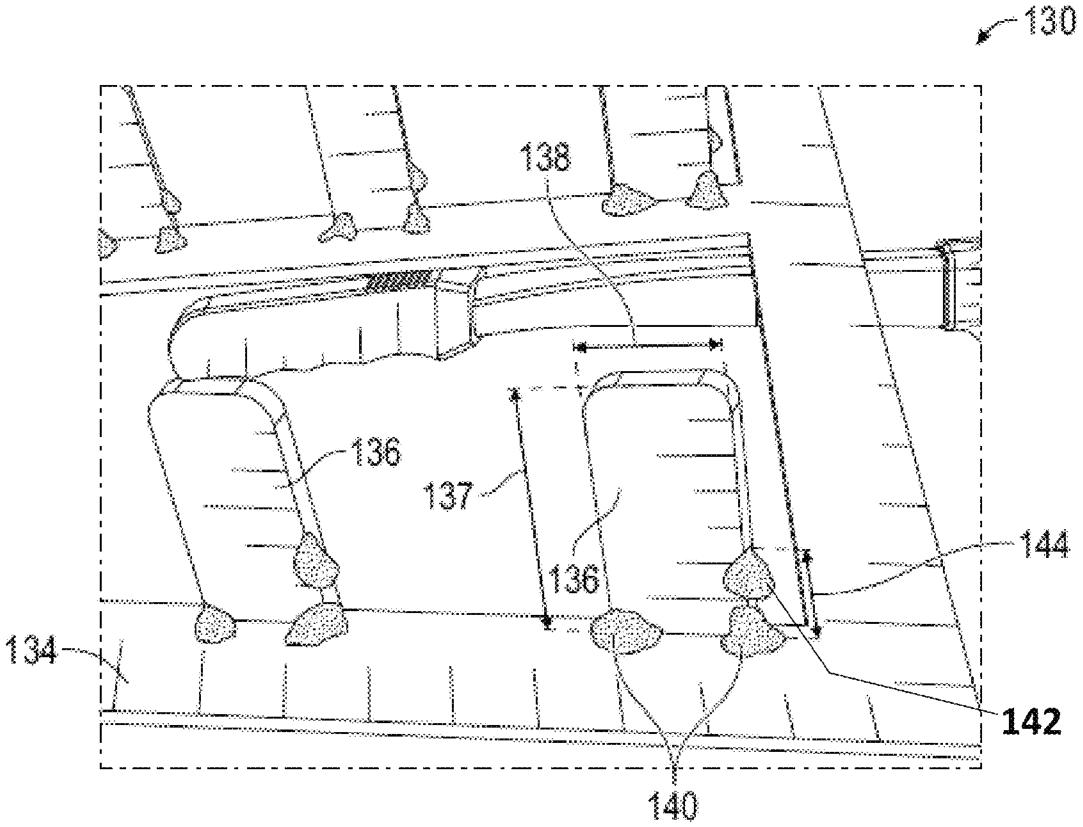
FIG. 4 illustrates an enlarged side view of the rack shown FIG. 3 in accordance with an example embodiment of the disclosure.
Figure 5:
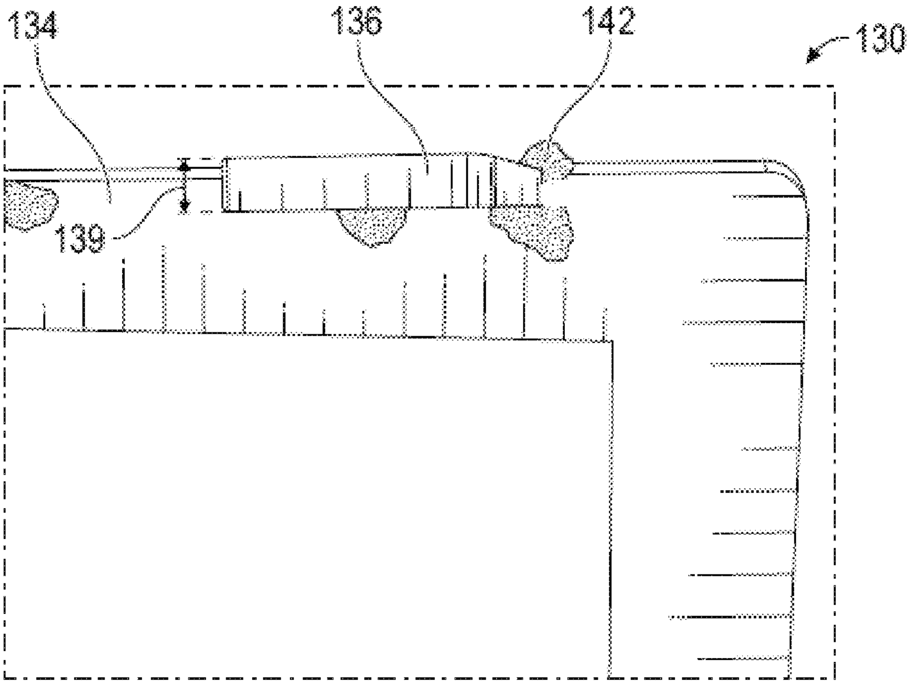
FIG. 5 illustrates an enlarged top view of the rack shown in FIG. 3 in accordance with an example embodiment of the disclosure.

Referring now to FIGS. 3, 4, and 5, a rack 130 is illustrated. The rack 130 can be placed on the collection tote 120, the funnel 125, and the perforated top 127 to provide a drainage system for draining viscous fluid from a large number of containers. One example container 112 is illustrated in an inverted position on the rack 130. The example rack 130 has a rectangular shape formed by four perimeter support bars 134, two of which are longer and are arranged longitudinally and two of which are shorter and arranged transversely. The rack 130 also has three intermediate support bars 135. Two of the intermediate support bars 135 are parallel to each other and are arranged longitudinally and one of the intermediate support bars 135 is arranged transversely. In other embodiments, racks having other shapes, such as circular or square, and varying configurations of support bars can be used in the drainage system.

The rack 130 has a series of tabs 136 on which the openings of containers are placed in an inverted position. In the example rack 130 of FIGS. 3-5, the tabs 136 are arranged approximately equidistantly from each other along the longitudinal perimeter support bars and the longitudinal intermediate support bars. In other embodiments, tabs can be arranged on a rack in other configurations. Each tab is oriented in a generally upward direction from the support bars. Each tab has a generally flat shape and comprises a tab length 137, a tab width 138, and a tab thickness 139. A tab longitudinal axis 146 passes through the center of the tab 136 along the tab length 137.

As shown in the example of FIGS. 3-5, the tabs 136 extend upward from the rack at a non-perpendicular angle with respect to the horizontal plane formed by the support bars of the rack. Specifically, the tab longitudinal axis 146 forms an acute angle 132 with the top surface of the support bars. Orienting the tabs 136 at a non-perpendicular angle relative to the support bars allows the containers to be placed onto the tabs at a non-perpendicular angle relative to the support bars. Placing the containers at a non-perpendicular angle relative to the support bars, i.e., relative to a horizontal plane formed by the support bars, facilitates draining of the viscous liquid from the containers into the collection tote. Example ranges for the acute angle 132 formed between the tab longitudinal axis 146 and the top surface of the support bars include, 45 to 85 degrees, and more preferably 55 to 80 degrees, and yet more preferably 65 to 75 degrees.

In the example rack 130, the tabs are attached to the support bars with one or more base welds 140. However, in other example embodiments the tabs can be formed on the rack through other means. For example, the tabs could be material that is integral with the support bars and is bent in an upward orientation from the support bars when the rack is fabricated. In yet other embodiments, the tabs can be joined to the support bars with other attachment means such as rivets or other types of fasteners.

Another feature of the tabs 136 that facilitates flow of the viscous fluid from the containers when the containers are placed in an inverted position on the rack is a tab protrusion 142. The tab protrusion 142 extends horizontally from the tab 136 at a displacement distance 144 above the support bars. The tab protrusion 142 prevents a container from sliding down onto the tab until the container engages the top surface of the support bars. As illustrated in FIG. 3, when the opening of the container 112 is placed onto the tab 136, the container slides down onto the tab until the perimeter of the container opening engages the tab protrusion 142. Because the collective width of the tab width 138 and the tab protrusion 142 is wider than the opening of the container, the container is stopped at the tab protrusion 142 so that it does not slide to the base of the tab 136 where it would engage the support bar. The tab protrusion 142 facilitates flow of the viscous fluid from the container by maintaining the container at the displacement distance 144 from the support bar. Maintaining the container at the displacement distance 144 assists in maintaining a clear flow path from the mouth of the container and preventing the mouth of the container from being occluded or partially occluded by the support bar.

The position of the displacement distance 144 can be selected to suit a particular application and should be selected to maintain a clear flow path for the viscous fluid flowing out of the container's opening. As examples, the displacement distance can be in the range of ⅛ of an inch to 1 inch from the base of the tab where it is attached to the support bar.

In the example illustrated in FIGS. 3-5, the tab protrusion 142 is formed by depositing tack weld material at the side of the tab 136 at the displacement distance 144. In other embodiments, the tab protrusion 142 can be formed by bending integral material from the tab outwardly, or by fastening additional material onto the side of the tab 136. In yet other embodiments, the tab can be formed with the tab protrusion 142 as an integral feature of the tab 136. Additionally, in other example embodiments, the tab protrusion can have other configurations such as two protrusions, with a protrusion extending from each side of the tab. Lastly, it should be understood that the tab protrusion is an optional feature and other embodiments of the rack may omit the tab protrusion feature.

Figure 6:
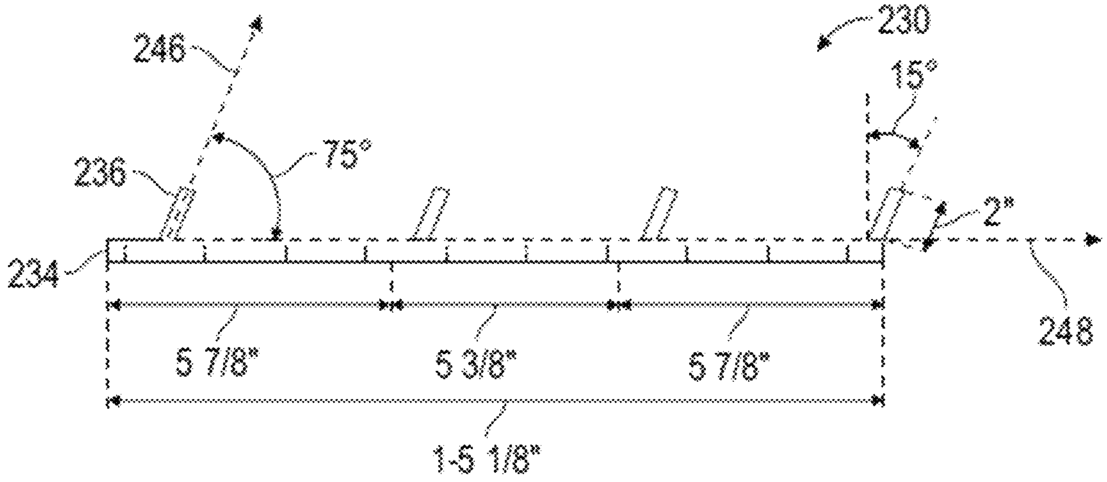
FIG. 6 illustrates a side view of another rack in accordance with an example embodiment of the disclosure.
Figure 7:
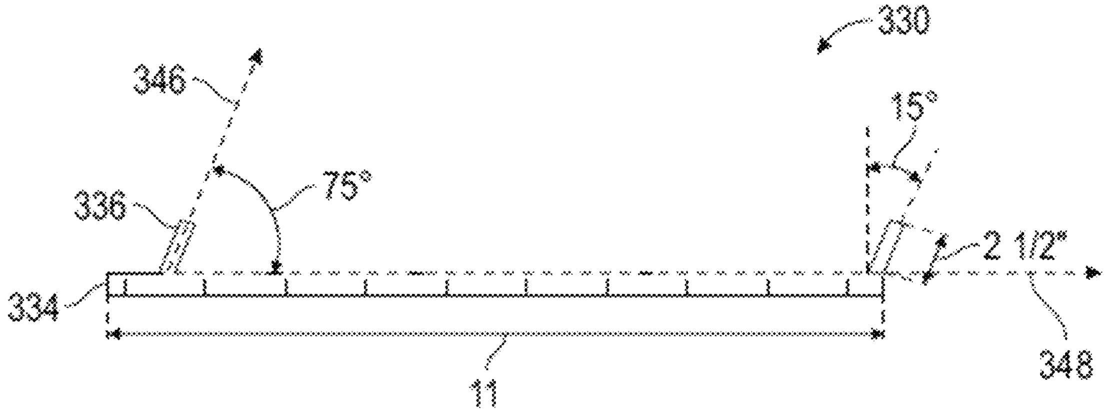
FIG. 7 illustrates a side view of yet another rack in accordance with an example embodiment of the disclosure.

Other example embodiments of racks to be used in drainage systems are illustrated in FIGS. 6 and 7. In FIG. 6, a side view of a rack 230 is shown. Rack 230 is similar to rack 130 in that it comprises perimeter support bars 234 forming a rectangular shape that can be placed on top of a collection tote in a drainage system. The example rack 230 includes a plurality of tabs 236 extending from the perimeter support bars 234 similar to the tabs 136 of FIGS. 3-5. The tabs 236 have a generally rectangular shape and have a tab width, a tab thickness, and a tab length. The illustrative dimensions provided in FIG. 6 show, as non-limiting examples, a tab length of 2 inches and tabs spaced apart 5⅜ inches and 5⅞ inches. Similar to the tabs 136 of FIGS. 3-5, tabs 236 have a tab longitudinal axis 246 extending through the center of each tab parallel to the tab length.

Tabs 236 of FIG. 6 are oriented at a non-perpendicular angle relative to the horizontal plane formed by the support bars of the rack 230. Accordingly, each tab 236 forms an acute angle between the tab longitudinal axis 246 and a support bar longitudinal axis 248. The acute angle for each tab in the example rack 230 is 75 degrees, although other acute angles ranging from 45 degrees to 85 degrees are possible. As described previously, the acute angle formed by the tabs 236 orients the containers at a similar acute angle when they are placed in an inverted position on the tabs and such an angle facilitates flow of viscous fluid from the containers. Although not shown in FIG. 6, similar to the tabs 136 of FIGS. 3-5, the tabs 236 also can have a tab protrusion that elevates a container opening above the support bar when the container opening is placed onto the tab.

In FIG. 7, another side view of a rack 330 is shown. Rack 330 is similar to rack 130 in that it comprises perimeter support bars 334 forming a rectangular shape that can be placed on top of a collection tote in a drainage system. The example rack 330 includes a plurality of tabs 336 extending from the perimeter support bars 334 similar to the tabs 136 of FIGS. 3-5. The tabs 236 have a generally rectangular shape and have a tab width, a tab thickness, and a tab length.

As compared to the rack 230 of FIG. 6, rack 330 of FIG. 7 has somewhat larger dimensions accommodating larger containers. The illustrative dimensions provided in FIG. 7 show, as non-limiting examples, a tab length of 2½ inches and tabs spaced apart by 11 inches. Similar to the tabs 136 of FIGS. 3-5, tabs 236 have a tab longitudinal axis 246 extending through the center of each tab parallel to the tab length.

Tabs 336 of FIG. 7 are oriented at a non-perpendicular angle relative to the horizontal plane formed by the support bars of the rack 330. Accordingly, each tab 336 forms an acute angle between the tab longitudinal axis 346 and a support bar longitudinal axis 348. The acute angle for each tab in the example rack 330 is 75 degrees, although other acute angles ranging from 45 degrees to 85 degrees are possible. As described previously, the acute angle formed by the tabs 336 orients the containers at a similar acute angle when they are placed in an inverted position on the tabs and such an angle facilitates flow of viscous fluid from the containers. Although not shown in FIG. 7, similar to the tabs 136 of FIGS. 3-5, the tabs 336 also can have a tab protrusion that elevates a container opening above the support bar when the container opening is placed onto the tab.

The example racks described herein can be fabricated from any of a variety of materials that are sufficiently rigid to form a structure that will support a plurality of containers while viscous liquid is drained from the containers. Example materials for fabricating the racks include aluminum, steel, other alloys, as well as various plastics.

Figure 8:
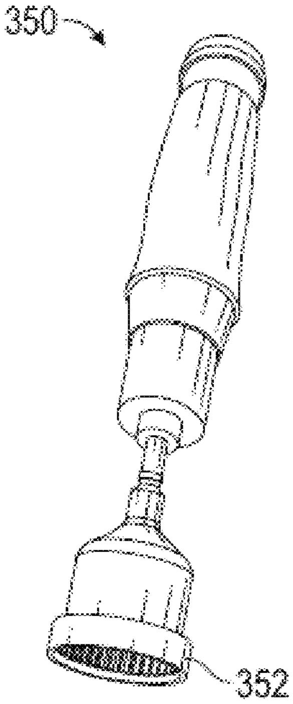
FIG. 8 illustrates a cap removal tool in the form of a drill and socket in accordance with an example embodiment of the disclosure.
Figure 9:
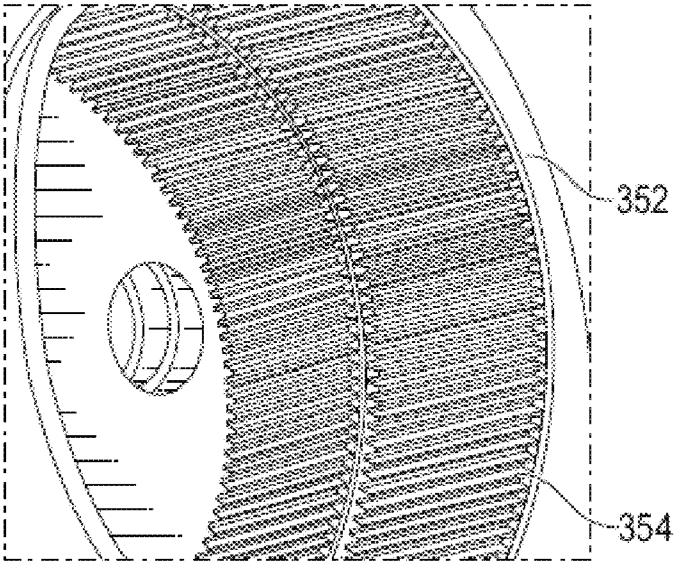
FIG. 9 illustrates an enlarged view of a socket in accordance with an example embodiment of the disclosure.
Figure 10:
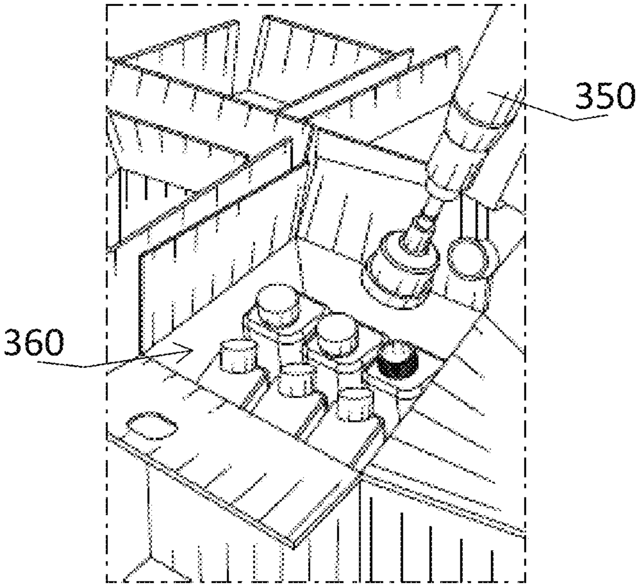
FIG. 10 illustrates removal of caps from containers using a cap removal tool in accordance with an example embodiment of the disclosure.

Referring now to FIGS. 8, 9, and 10, an example cap removal tool 350 is illustrated. When a need arises to drain a large number of containers containing viscous fluid, the cap removal tool 350 assists in expediting the process. The cap removal tool 350 can take a variety of forms and can be powered or manual. In the example of FIGS. 8-10, the cap removal tool 350 is a powered drill having a rotating drive shaft. At the end of the rotating drive shaft is a socket 352 that can be used to grip and rotate caps on containers so that they can be quickly and easily removed. As illustrated in FIG. 9, the socket 352 can include knurling 354 on the interior face of the socket that aids in gripping the container caps for rotation and removal. FIG. 10 illustrates the cap removal tool 350 being used to remove caps from containers 360 that contain viscous fluid (e.g., machine lubricant) which must be drained. After the caps have been removed from the containers, the containers can be drained using a drainage system.

Figure 11:
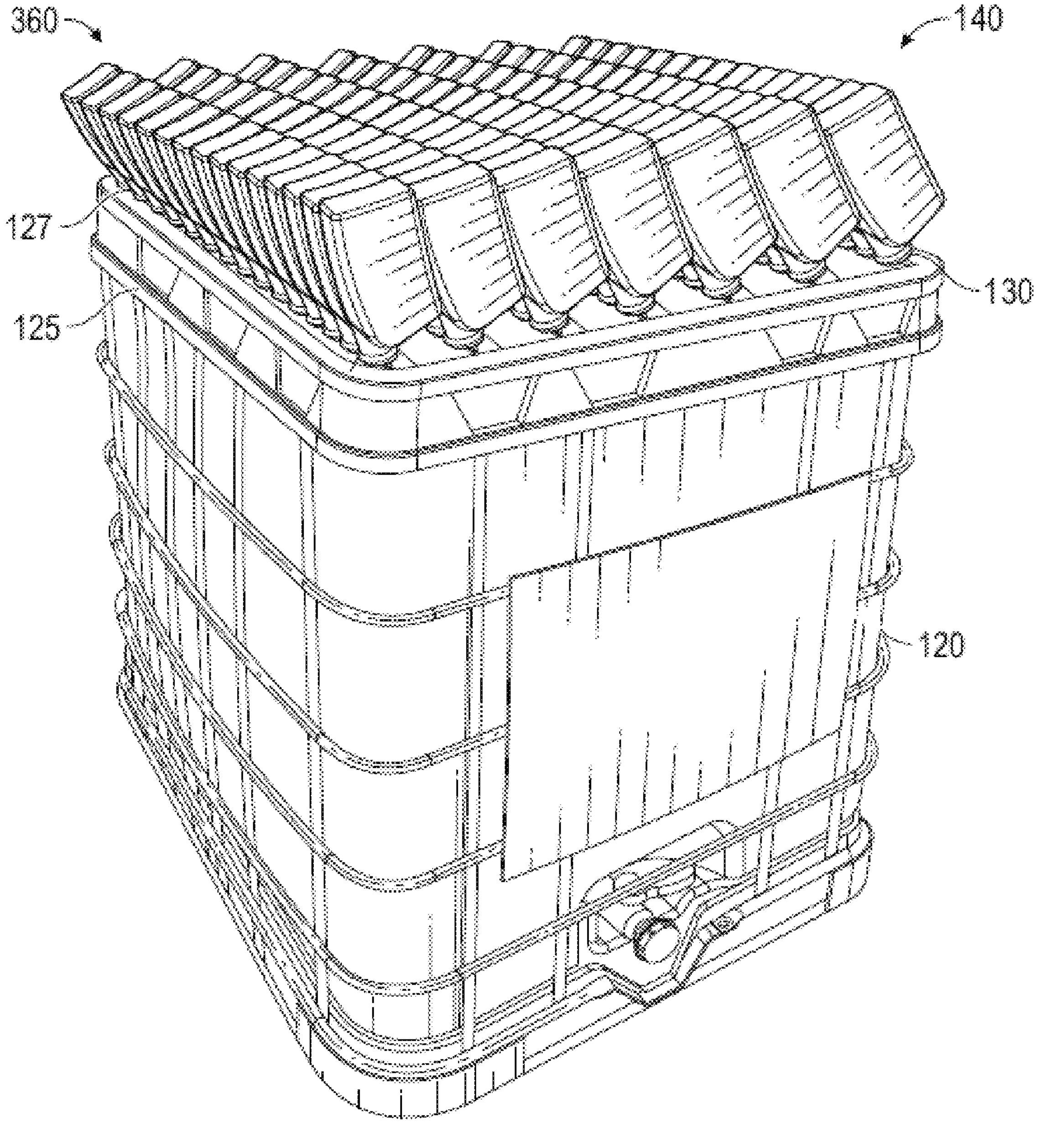
FIG. 11 illustrates a drainage system in accordance with an example embodiment of the disclosure.
Figure 12:
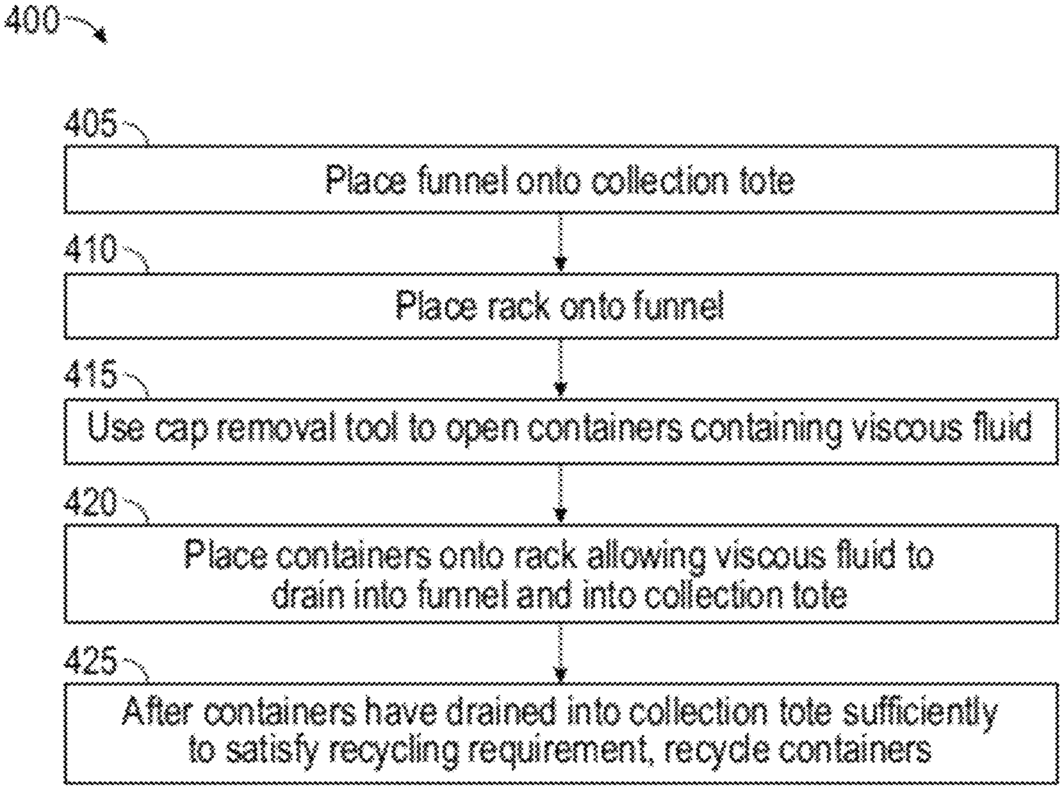
FIG. 12 illustrates a method for draining containers using a drainage system in accordance with an example embodiment of the disclosure.

FIG. 11 illustrates a drainage system 140 in use and FIG. 12 describes a process for using the drainage system. As previously described in connection with FIG. 2, the drainage system 140 includes a collection tote 120 into which the viscous fluid drains. As referenced in operation 405 of FIG. 12, a funnel 125, and optionally a perforated top 127, are placed on the collection tote 140. In operation 410, rack 130, as described in connection with FIGS. 3-5, is placed on top of the funnel 125 and perforated top 127. In operation 415, a cap removal tool is used to remove caps from containers in a manner such as that illustrated in FIGS. 8-10. After the caps have been removed from the containers, in operation 420, the containers are placed onto each of the tabs of the rack. FIG. 11 illustrates the drainage system 140 with the containers 360 placed in an inverted position on each of the tabs of the rack 130. Because the tabs of the rack 130 are at an acute angle relative to the horizontal plane of rack's support bars, the containers are also positioned at a similar acute angle to facilitate drainage of the viscous fluid from the containers. Because the drainage rack accommodates many containers, the process for draining a large number of containers is expedited. The drainage system 140 provides an efficient system for draining viscous fluid from many containers into the collection tote, while workers are free to complete other tasks. The drainage system 140 also effectively drains the majority of the viscous fluid from the containers so that the containers will satisfy the three drip per minute standard and, therefore, can be more easily recycled. In operation 425, the drained containers are recycled. It should be understood that the method illustrated in FIG. 12 is a non-limiting example and in alternate embodiments certain of the steps of FIG. 12 can be modified.

Assumptions and Definitions

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as “first” and “second” are used merely to distinguish one element (or state of an element) from another. Such terms are not meant to denote a preference and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms “a,” “an,” and “the” are intended to include plural alternatives, e.g., at least one. The terms “including”, “with”, and “having”, as used herein, are defined as comprising (i.e., open language), unless specified otherwise.

Values, ranges, or features may be expressed herein as “about”, from “about” one particular value, and/or to “about” another particular value. When such values, or ranges are expressed, other embodiments disclosed include the specific value recited, from the one particular value, and/or to the other particular value. Similarly, when values are expressed as approximations, by use of the antecedent “about,” it will be understood that the particular value forms another embodiment. It will be further understood that there are a number of values disclosed therein, and that each value is also herein disclosed as “about” that particular value in addition to the value itself. In another aspect, use of the term “about” means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An apparatus comprising:

a collection tote into which viscous liquid is drained, the collection tote comprising a base, at least one wall, and a top opening;

a funnel placed on the top opening of the collection tote; and a rack disposed on the funnel, the rack comprising a support bar extending horizontally across at least a portion of the funnel, the support bar comprising a plurality of tabs attached to and extending from the support bar, wherein each of the plurality of tabs comprises a tab longitudinal axis and is joined to the support bar at a base, and wherein each of the plurality of tabs has a tab protrusion located at a displacement distance from the base, the displacement distance being parallel to the tab longitudinal axis.

2. The apparatus of claim 1, further comprising a perforated plate disposed on the funnel wherein the rack is disposed on the perforated plate.

3. The apparatus of claim 1, wherein the tab longitudinal axis of each of the plurality of tabs forms an acute angle with a support bar longitudinal axis of the support bar.

4. The apparatus of claim 3, wherein the acute angle is greater than 45 degrees and less than 90 degrees.

5. The apparatus of claim 3, wherein each of the plurality of tabs comprises a length, a width, and a thickness, wherein the width is greater than or equal to 1 inch and less than or equal to 1.5 inches.

6. The apparatus of claim 5, wherein the length is parallel to the tab longitudinal axis and is greater than or equal to 2 inches and less than or equal to 5 inches.

7. The apparatus of claim 1, wherein when a container is placed onto one of the plurality of tabs, the tab protrusion displaces an opening of the container from the support bar by the displacement distance.

8. The apparatus of claim 1, wherein the rack comprises a second support bar extending across at least a portion of the funnel and a second plurality of tabs attached to and extending from the second support bar, wherein the second support bar is spaced apart from the support bar by a distance that is greater than or equal to 5 inches and less than or equal to 18 inches.

9. The apparatus of claim 1, wherein the rack is fabricated with stainless steel.

10. A method for simultaneously draining a plurality of containers, the method comprising:

placing a funnel onto a collection tote;

placing a rack onto the funnel, the rack comprising a support bar extending horizontally across at least a portion of the funnel, the support bar comprising a plurality of tabs attached to and extending from the support bar, wherein each of the plurality of tabs comprises a tab longitudinal axis and is joined to the support bar at a base, and wherein each of the plurality of tabs has a tab protrusion located at a displacement distance from the base, the displacement distance being parallel to the tab longitudinal axis;

using a cap removal tool to remove caps from the plurality of containers;

placing the plurality of containers in an inverted position onto the rack, wherein an opening of each container of the plurality of containers is placed onto a tab of the plurality of tabs;

draining viscous fluid from the plurality of containers into the collection tote; and recycling the plurality of containers.

11. The method of claim 10, wherein the tab longitudinal axis of each of the plurality of tabs forms an acute angle with a support bar longitudinal axis of the support bar.

12. The method of claim 11, wherein the acute angle is greater than 45 degrees and less than 90 degrees.

13. The method of claim 11, wherein each of the plurality of tabs comprises a length, a width, and a thickness, wherein the width is greater than or equal to 1 inch and less than or equal to 1.5 inches.

14. The method of claim 10, wherein when a container of the plurality of containers is placed onto one of the plurality of tabs, the tab protrusion displaces an opening of the container from the support bar by the displacement distance.

15. The method of claim 14, wherein the displacement distance is at least ⅛ of an inch and less than 2 inches.

16. The method of claim 14, wherein the container remains on the tab until a drip rate of the viscous fluid draining from the container is less than three drips per minute.

17. The method of claim 10, wherein the cap removal tool comprises:

a rotary motor that turns a drive shaft; and a socket that attaches to the drive shaft, the socket being shaped to engage the caps of the plurality of containers, wherein the socket comprises knurling on an inner face of the socket.

18. The method of claim 17, wherein the socket can be detached from the drive shaft and a second socket can be attached to the drive shaft, the second socket having knurling of a second size that meshes with grooves on a second container cap.

* * * * *